United States Patent [19]
Jones et al.

[11] 3,833,340
[45] Sept. 3, 1974

[54] DETERMINATION OF WATER CONTENT OF LIQUID MIXTURES

[75] Inventors: Graham P. Jones, London, England; Frederick R. Mahn, Verona, N.J.

[73] Assignee: Drew Chemical Corporation, Parsippany, N.J.

[22] Filed: Dec. 4, 1972

[21] Appl. No.: 311,807

[52] U.S. Cl............. 23/230 HC, 73/73, 23/230 R, 73/61.1 R
[51] Int. Cl. ......................................... G01n 25/56
[58] Field of Search ........ 73/73, 53, 61, 29, 61.1 R; 23/230 HC, 230 R; 252/408

[56] References Cited
UNITED STATES PATENTS
2,145,203  1/1939  Walker et al. ...................... 73/73 X
3,607,782  9/1971  Rosen ................................ 73/73 X OTHER PUBLICATIONS
"Methods for Determining water in Petroleum," Irving Allen et al., Dept. of Interior, Bureau of Mines Tech., 25, 1912, Pg. 8.
Farrington Daniels et al., Physical Chemistry, 1966, pp. 53–56.

*Primary Examiner*—Richard C. Queisser
*Assistant Examiner*—Stephen A. Kreitman
*Attorney, Agent, or Firm*—Marn & Jangarathis

[57] ABSTRACT

A material which produces heat when in contact with water is added to a water containing liquid mixture and the increase in temperature is recorded. From a known relationship between water content and temperature increase resulting from contact between water and the material, the water content of the liquid mixture is easily determined.

6 Claims, No Drawings

DETERMINATION OF WATER CONTENT OF LIQUID MIXTURES

This invention relates to a new and improved process for determining the water content of a liquid mixture.

In many operations, it is necessary to determine the water content of a liquid mixture. For example, in the deemulsification of oil/water emulsions, the water content of the emulsion is of importance in effecting such deemulsification. In field work, such as sampling of oil/water slops, there is not, at present, a simple means for determining the water content of an oil-water mixture.

An object of the present invention is to provide a new and improved process for determining the water content of a liquid mixture.

Another object of the present invention is to provide an improved process for determining the water content of an oil-water mixture.

A further object of the present invention is to provide a process for determining the water content of a liquid which can be accomplished in a rapid and facile manner.

These and other objects of the present invention will become more readily apparent from reading the following detailed description thereof.

The objects of the present invention are broadly accomplished by adding to a water containing liquid mixture a material which interacts with the water to generate a measurable exotherm. The temperature increase of the liquid is measured, and such temperature increase is compared with a known relationship between temperature increase and water content. Accordingly, the measurement of the increase in temperature of the liquid, in fact, is a measurement of the water content of the liquid.

The additive material which is added to the water-containing liquid mixture is a solid or liquid material, preferably a liquid material, which produces heat when placed in contact with water and does not produce heat when placed in contact with the other component or components of the liquid mixture. In general, the liquid mixture, the water content of which is to be measured, is comprised of an oil and water, and accordingly, an acid or a base, which is known to produce heat when contacted with water is a preferred material in that acids and bases do not produce heat in contact with oils. As representative examples of acids and bases which are preferably employed in accordance with the teachings of the present invention, there may be mentioned: inorganic acids and bases such as sulfuric acid, nitric acid, hydrochloric acid, sodium hydroxide, potassium hydroxide and the like. It is to be understood, however, that the scope of the present invention is not to be limited to the hereinabove described representative materials in that the selection of other materials which produce a measurable exotherm when diluted with water are deemed to be well within the scope of those skilled in the art from the teachings herein.

The present invention is particularly applicable to determining the water content of liquid mixtures in which the other component of the mixture is one or more of the following: animal, vegetable or mineral oils, refined or crude aromatic or aliphatic hydrocarbons, chlorinated hydrocarbons and the like. It is to be understood, however, that the scope of the invention is not to be limited to such representative materials.

The amount of water present in the water containing liquid mixture is determined from a previously determined relationship between the heat generated, as measured by temperature increase, by contacting the additive material with liquid mixtures having known quantities of water. In other words, for a specified additive material, the quantity of heat released is dependent upon the amount of water present in the liquid mixture, and accordingly, the temperature rise resulting from mixing the material and liquid mixture is a facile way of measuring the quantity of water present in the liquid mixture.

In practise, fixed quantity samples of water containing liquid mixtures which have known quantities of water over the range from 0% to 100% are prepared and a known quantity of additive material is added to each of the samples. The temperature of the mixture is measured before and after addition of the additive material in order to measure the temperature rise resulting from the addition of the additive material. From this data, a plot may be prepared with the water concentration as the abscissa and the temperature rise as the ordinate (the plot is generally not a straight line), and this plot may now be used for measuring the water content of liquid mixtures having unknown quantities of water; i.e., by adding the known quantity of additive material for which the plot was prepared to the fixed quantity sample of the liquid mixture, having the unknown water content, which corresponds to the quantity used in preparing the plot, measuring the temperature rise resulting from the addition and reading from the plot the water concentration corresponding to the measured temperature rise.

In such cases, the exotherm resulting from the addition of the specified material may cause the temperature to increase to a temperature above the boiling point of water. In such cases the curve is prepared and the test is effected in the presence of a predetermined quantity of a specified diluent which acts as a heat sink to prevent an undue temperature rise. As should be apparent to those skilled in the art the diluent material is preferably one which does not produce a measurable exotherm when contacted with water.

The present invention is particularly applicable to measuring the water content of oils, with the preferred additive material being an acid; in particular sulfuric acid. In such a preferred use, the liquid mixture, the water content of which is to be measured, can not be highly alkaline in that the acid would react with basic material, generating more heat than that resulting from a dilution effect, whereby the test would indicate a higher water content than that actually present. It is to be understood, however, that the scope of the invention is not to be limited to such preferred use.

The invention will be further described with respect to the following examples, but it is to be understood that the scope of the invention is not to be limited thereto. In the following examples, all parts and percent are by weight.

EXAMPLE I 20 ml. samples of emulsions of water and mineral oil are prepared having the following water contents: 0 percent, 10 percent, 20 percent, 30 percent, 40 percent, 50 percent, 60 percent, 70 percent, 80 percent, 90 percent and 100 percent. To each sample there is added, as a diluent, 60 ml. of mineral oil to provide 80 ml. samples.

To each of the 80 ml. samples, the temperature of which was previously measured, there is added 20 ml. ± 0.5 ml. of concentrated (98 percent) sulfuric acid and the mixture is vigorously shaken for about 5 seconds. The maximum temperature of the mixture is then recorded. The following relationship is recorded:

| % Water | Initial Temperature °C | Final Temperature °C | Temperature Rise |
|---|---|---|---|
| 0 | 26.0 | 26.0 | 0.0 |
| 10 | 26.0 | 44.0 | 18.0 |
| 20 | 26.0 | 56.0 | 30.0 |
| 30 | 26.0 | 63.0 | 37.0 |
| 40 | 26.0 | 69.0 | 43.0 |
| 50 | 27.0 | 73.0 | 46.0 |
| 60 | 25.0 | 74.0 | 49.0 |
| 70 | 25.0 | 76.0 | 51.0 |
| 80 | 25.0 | 79.0 | 54.0 |
| 100 | 25.0 | 84.0 | 59.0 |

A plot of the above data provides a relationship between temperature increase and water content over the entire range of 0 percent – 100 percent water.

EXAMPLE II

The data obtained in Example I is used to determine the water content of various oil water mixtures. A 20 ml. sample of the oil water mixture is obtained and the mixture is diluted with 60 ml. of the mineral oil used in Example I to provide an 80 ml. sample, 20 ml. of concentrated (98 percent) sulfuric acid is then added to the 80 ml. sample. The temperature of the water, as described with reference to Example I, is measured before and after the addition of sulfuric acid. From the plot prepared from the data obtained in Example I the water content of the sample is obtained. The water content of each of the samples is also determined by the Karl-Fisher method (ASTM method 1,364-55T) and the Determination of Moisture by Azeotrope Distillation method (ASTM method D 1,568-58T). The results are as follows:

Samples

| | % Water (above method) | % Water Karl-Fisher | % Water azeotrope |
|---|---|---|---|
| Crude Oil Slops | | | |
| A | 87 | 84 | 85 |
| B | 30 | 29 | 29 |
| C | 1.5 | 0.6 | 0.75 |
| Machine Cutting Oil Slops | | | |
| D | 35 | 37 | 38 |
| E | 65 | 62 | 60 |
| Miscellaneous Oil Slops | | | |
| F | 10 | 10 | 9.9 |
| G | 47.5 | 51 | 49.2 |

The close agreement between the method of the present invention and established methods indicates that the method of the present invention is suitable for determining the water content of water containing liquid mixtures.

The present invention is particularly advantageous in that the water content of a water containing liquid mixture can be facilely determined. In particular, the process of the present invention, unlike presently established tests, can be facilely used, in the field, to make water content determinations at an accuracy in the order of 5 percent. Furthermore, the test of the present invention does not require the use of highly skilled personnel.

Numerous modifications and variations of the present invention are possible in light of the above teachings and, therefore, within the scope of the appended claims, the invention may be practised other than as particularly described.

What is claimed is:

1. A process for determining the water content of a liquid mixture containing water and at least one member selected from the group consisting of animal, vegetable and mineral oils, refined and crude aromatic and aliphatic hydrocarbons and chlorinated hydrocarbons, comprising:
   a. adding to said liquid mixture a material which generates measurable exotherm by interaction with water in said liquid mixture;
   b. measuring the increase in temperature resulting from the addition of said material to the liquid mixture; and
   c. comparing the measured increase in temperature with a predetermined relationship between water content and increase in temperature resulting from addition of said material to said liquid mixture having known quantities of water, to thereby determine the water content of said liquid mixture.

2. The process of claim 1 wherein said material is an inorganic acid.

3. The process of claim 1 wherein said material is an inorganic base.

4. The process of claim 1 wherein said material is sulfuric acid.

5. The process of claim 1 wherein the addition of said material to said liquid mixture is effected in the presence of a fixed quantity of liquid diluent and said comparing is effected with a predetermined relationship between water content and increase in temperature resulting from addition of said material to said liquid mixture having known quantities of water in the presence of said fixed quantity of liquid diluent.

6. The process of claim 5 wherein said material is an inorganic acid.

* * * * *